2,908,660

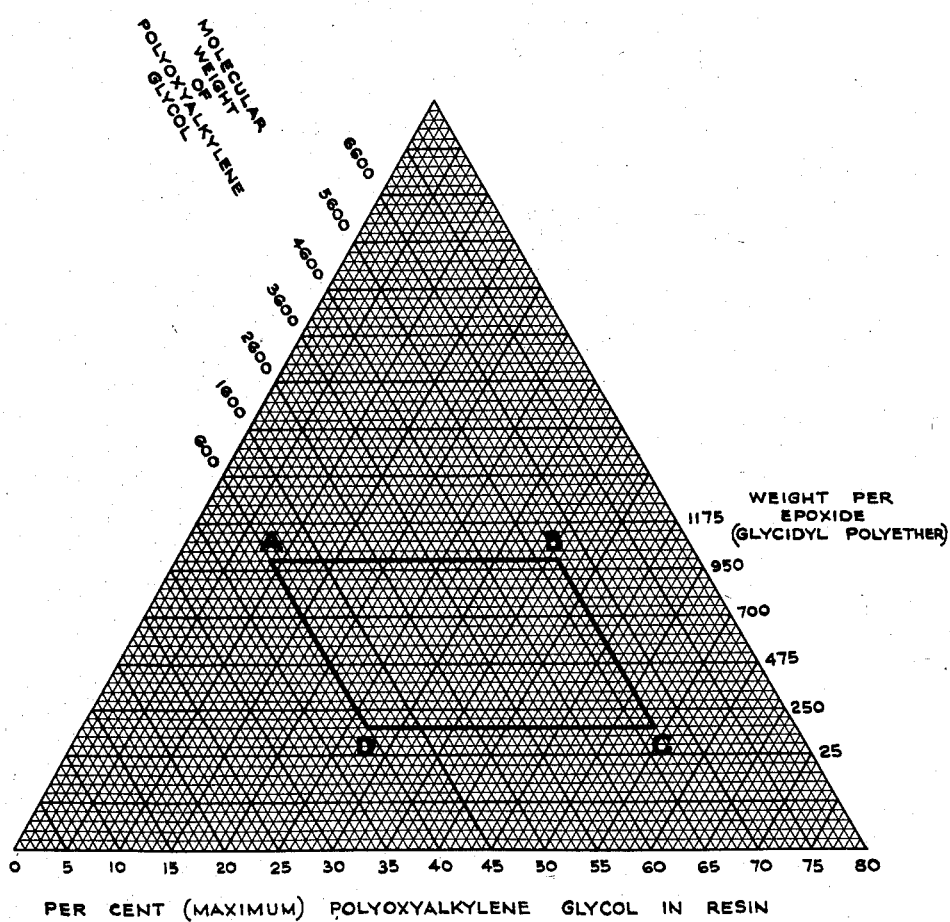

POLYEPOXIDE POLYALKYLENE GLYCOL-ANHYDRIDE COMPOSITIONS AND PROCESSES FOR THEIR PREPARATION

William J. Belanger, Louisville, Ky., assignor to Devoe & Raynolds Co., Inc., a corporation of New York Application June 11, 1956, Serial No. 590,645

19 Claims. (Cl. 260—32.8)

This invention relates to novel resin compositions. In one of its aspects the invention relates to resin compositions having a wide range of flexibility, which are derived from epoxide compounds. In another of its aspects the invention pertains to methods for the preparation of these novel resins. In still other of its aspects the invention pertains to a novel class of fusible resinous hot-melt compositions, to coating compositions, and to similar products obtainable therefrom.

It is known that epoxide resins, obtained as a product of reaction of a phenol having at least two phenolic hydroxyl groups and an epihalohydrin, can be converted to thermosetting resins by the use of a polybasic carboxylic acid anhydride. For example, a dibasic carboxylic acid anhydride such as phthalic acid anhydride is condensed with an epoxide resin. The resulting thermosetting resins, however, are hard substances. The extreme hardness of these resins gives a limited range of usefulness.

Another known prior art process for preparing thermosetting resins from epoxide resins involves the combination of ethoxyline or epoxide resins with acidic polyesters containing at least two free carboxyl groups, such as the polyesters obtained by reacting one mol of a dihydric alcohol with two mols of a dicarboxylic acid. According to this process the acidic polyester is first prepared; the polyester is then heated and while in a fluid condition the epoxide resin, also heated to a fluid state if necessary, is added. The mixture of these two ingredients is then heated at a temperature sufficient to effect intercondensation between the ingredients. While the resins resulting from this reaction are less brittle and appear to be tougher than those derived from the use of phthalic anhydride alone, they are nevertheless not as flexible as desired for many purposes.

In accordance with an embodiment of this invention extremely flexible resins, heretofore unobtainable from epoxides, can be prepared. In another embodiment of the invention cured epoxide compositions can be prepared varying from hard, tough products to tough, rubbery compositions as desired. The flexibility of products obtainable by this invention gives them an extremely broad range of usefulness, for example, in the potting and casting fields, as well as in the field of foamed products and similar arts.

According to one aspect of the invention cured resin compositions having a wide range of flexibility are obtained by the reaction of (a) a glycidyl polyether containing more than one epoxide group per molecule and having a weight per epoxide below 1000 and (b) a polyoxyalkylene glycol having a molecular weight of from 600 to 6000 with (c) an excess of polybasic acid anhydride beyond that required to react with the polyoxyalkylene glycol. Normally when these three ingredients are reacted, an elevated temperature is employed, for example, a temperature sufficient to dissolve, in the glycidyl polyether, the polybasic acid anhydride. The resin compositions prepared in accordance with an aspect of the invention thus include a curable mixture of a glycidyl polyether, a polycarboxylic acid anhydride, and a high molecular weight polyoxyalkylene glycol. The cured compositions vary from hard products to flexible, tough compositions, the degree of flexibility of the cured resin increasing as the proportion and molecular weight of polyoxyalkylene glycol employed increases, as will be described.

It is considered that the reaction taking place when the glycidyl polyether, polyoxyalkylene glycol and the polybasic acid anhydride are combined is not merely the reaction with glycidyl polyether of a diester of the polyoxyalkylene glycol, having two free carboxyl groups, for example, as prepared by the reaction of two mols of phthalic acid with one mol of a dihydric alcohol. When such an ester is reacted with a glycidyl polyether a reaction, preferentially, takes place between a free carboxyl group and an epoxide group. Hence, if an ester having two free carboxyl groups is reacted with a diglycidyl polyether the resulting product will theoretically be a linear polymer, since both reactants are difunctional or less than difunctional.

The reaction of this invention differs from the known use of esters particularly because in accordance with this invention the polybasic acid anhydride is present beyond that required to react with (or equivalent to) the polyoxyalkylene glycol. Therefore, excess polybasic acid anhydride acts as a cross-linking agent. When only the ester having free carboxyl groups is reacted with an epoxide resin the carboxyl groups react with epoxide groups. Acid anhydride, however, will not react with the epoxy groups, but preferentially will react with a hydroxyl group, either present in the glycidyl polyether, or formed by the previous reaction of an epoxide group with a carboxyl group. The polybasic acid anhydride, having reacted with a hydroxyl group now contains a free carboxyl group which itself can react with another epoxide group, thus providing another hydroxyl group which is free to react with additional polybasic acid anhydride. Through this reaction a cross-linked polymer is formed which does not result from the reaction with glycidyl polyether of merely a diester of a dihydric alcohol having two free carboxyl groups.

The general procedure for preparing resin compositions in accordance with this invention is to mix the glycidyl polyether, the polybasic acid anhydride, and the polyoxyalkylene glycol and to heat the mixture, with stirring, until a homogeneous mixture is obtained. To obtain this homogeneous mixture the amount of heat required generally is sufficient to dissolve the phthalic or other polybasic acid anhydride in the glycidyl polyether. This temperature is conveniently about 80° C. and is adjusted to afford a means for controlling the reaction rate. In any case, the temperature should not be sufficiently high to cause premature gelation. The homogeneous mixture can thus, if desired, be poured into a container of desired shape and further reacted to obtain the cure. Excellent cures are obtained by the use of an alkaline catalyst, but the reaction is not limited to the use of such a catalyst.

It is to be understood, however, that the procedure may be varied. For instance, it is not necessary to use the polyoxyalkylene glycol per se so long as the glycol is incorporated into the final resin. Thus, it is possible to mix the polybasic acid anhydride, the polyoxyalkylene glycol, and the glycidyl polyether and heat the reaction mixture to form a resin of this invention. It is also contemplated that the polyoxyalkylene glycol, either completely or partially esterified with the acid, can be used along with additional acid anhydride to form the resins of this invention. As an example, it is possible to react glycidyl polyether and acid anhydride with a product formed by the reaction of one mol of a dibasic acid anhydride with one mol of glycol, that is, the half ester. Another method of making the resin of this invention is to react the completely esterified glycol with glycidyl polyether and additional acid anhydride. In other words, the product resulting from the reaction of two mols of a dibasic acid anhydride with one mol of the polyoxyalkylene glycol can be reacted with glycidyl polyether and additional acid anhydride to form a resin of this invention. Summarizing, there are three methods by which resins of this invention can be made. Polyoxyalkylene glycol, acid anhydride, and a glycidyl polyether can be combined. The dibasic acid anhydride half ester of polyoxyalkylene glycol can be combined with acid anhydride and glycidyl polyether, or the completely esterified polyoxyalkylene glycol can be reacted with acid anhydride and glycidyl polyether in accordance with this invention.

As indicated, this invention is applicable to glycidyl polyethers containing more than one epoxide group per molecule and having a weight per epoxide below 1000. Desirable glycidyl polyethers are glycidyl polyethers of polyhydric phenols or polyhydric alcohols. Such glycidyl polyethers are generally produced by the reaction of epichlorhydrin or glycerol dichlorhydrin with dihydric phenols, polyhdric phenols or polyhydric alcohols in the presence of a curing agent, for example, caustic alkali. The glycidyl polyethers are employed in amounts of from 20 to 70 percent by weight on the composition depending upon the amount of polyoxyalkylene glycol and anhydride employed.

The weights perepoxide employed throughout this description are determined from epoxide equivalents. The epoxide equivalent represents the weight of the product per epoxide group. The epoxide equivalent of these epoxy compounds is determined by titrating a one gram sample with an excess of pyridine containing pyridine hydrochloride (made by adding 16 cc. of concentrated hydrochloric acid per liter of pyridine) at the boiling point for 20 minutes and back titrating the excess of pyridine hydrochloride with 0.1 N sodium hydroxide using phenolphthalein as indicator, and considering one HCl as equivalent to one epoxide group. Normally the molecular weight of the glycidyl polyether is assumed to be two times the weight per epoxide. Molecular weight determinations can be made by a standard boiling point elevation method. In some cases, the molecular weight values correspond approximately to the theoretical values for a straight chain polymer. In other cases, however, a higher molecular weight value is obtained, seemingly indicating a more complex structure.

The products resulting from the reaction of a polyhydric alcohol or polyhydric phenol with epichlorhydrin or glycerol dichlorhydrin are monomeric and straight chain polymeric products characterized by the presence of at least one terminal epoxide group. Monomeric polyglycidyl polyethers include the glycidyl polyethers of the polyhydric phenols obtained by reacting, in an alkaline medium, a polyhydric phenol with an excess, e.g., 4 to 8 mole excess, of an epihalohydrin. Thus, a polyether which is substantially 2,2-bis(2,3-epoxypropoxyphenyl) propane is obtained by reacting bisphenol [2,2-bis(4-hydroxyphenyl)propane] with an excess of epichlorhydrin. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydroxy-naphthalene. The epihalohydrins can be further exemplified by 3-chloro-1,2-epoxy-butane, 3-bromo-1,2-epoxy-hexane, 3-chloro-1,2-epoxy-octane, and the like.

One class of straight chain polymeric glycidyl polyethers is produced by the reaction of a polyhydric phenol such as bisphenol with epichlorhydrin or glycerol dichlorhydrin using different proportions of reactants. In the production of this class of epoxide resins the proportions of bisphenol and epichlorhydrin or glycerol dichlorhydrin vary from about 1 bisphenol to 1.2 epichlorhydrin or glycerol dichlorhydrin to about about 1 bisphenol to 1.5 epichlorhydrin or glycerol dichlorohydrin as set forth in U.S. Patent 2,615,007. In addition, sufficient caustic alkali is employed to combine with the chlorine atom of the epichlorhydrin or glycerol dichlorhydrin.

Another group of polymeric glycidyl polyethers is produced by the reaction of a dihydric phenol such as bisphenol with epichlorhydrin in the proportions of about 2 mols of epichlorhydrin to about 1 mol of bisphenol and with the use of caustic alkali in amounts sufficient to combine with the chlorine of the epichlorhydrin. Such glycidyl polyethers are described in U.S. Patent 2,582,985.

Included are polyepoxypolyhydroxy polyethers obtained by reacting, epichlorhydrin, or glycerol dichlorhydrin, with a mononuclear dihydric phenol such as resorcinol, hydroquinone, catechol, phloroglucinol, etc., or a polynuclear dihydric phenol, such as bisphenol (p,p'-dihydroxydiphenyl dimethyl methane), p,p'-dihydroxyphenone, p,p'-dihydroxyphenyl, p,p'-dihydroxydibenzyl, o,p,o',p'-tetrahydroxydiphenyl dimethyl methane, hematoxylin, polyhydric anthracenes, polyhydric naphthalenes, etc. Bisphenol is particularly advantageous for use in making these glycidyl polyethers.

Another group of polymeric glycidyl polyethers which can be used in accordance with this invention results from the reaction, generally in alkaline or acid medium, of a polyhydric alcohol or polyhydric phenol with a glycidyl polyether. Examples of such polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methylpropyl) ether, the reaction product of pentaerythritol and 1,2-epoxy-4,5-epoxypentane, and the reaction product of bisphenol and bis(2,3-epoxy-2-methylpropyl)ether, the reaction product of resorcinol and bis(2,3-epoxypropyl) ether, and the reaction product of catechol and bis(2,3-epoxypropyl)ether. The process for preparing polyepoxypolyhydroxy polyethers of this group is disclosed in U.S. Patent 2,615,008.

It has been noted hereinbefore that polyhydric alcohols can be used in the preparation of these glycidyl polyethers as well as polyhydric phenols. As set forth in U.S. Patent 2,581,464 these glycidyl polyethers are obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, subsequently treating the resulting product with an alkaline compound.

According to this invention, a glycidyl polyether, a polyoxyalkylene glycol and a polybasic acid anhydride are combined. Polyoxyalkylene glycols which are employed according to this invention include polyoxyalkylene glycols having the formula $HOCH_2(CH_2OCH_2)_xCH_2OH$, as well as substituted polyoxyalkylene glycols such as polyoxypropylene glycol and mixtures of polyoxyalkylene glycols. Higher molecular weight polyoxyethylene glycols, for example, those having average molecular weights of 600 to 6000 are found to give the best results with respect to ease of cure and all-around toughness and flexibility. In other words, when unsubstituted polyoxyalkylene glycols are employed, $x$ in the above formula will be from about 11 to 140. Inasmuch as these polyoxyalkylene glycols are readily commercially available, further discussion thereof is considered unnecessary.

The polybasic acid anhydrides useful in preparing the resinous compositions of this invention may contain one or more anhydride groups. As pointed out in setting forth the reactions applicable to this invention, one reaction involved is that between the anhydride group and a hydroxy radical, the anhydride employed being in excess of that equivalent to, or required to react with or to esterify the polyoxyalkylene glycol. The use of the diester of polyoxyalkylene glycol, containing free carboxyl groups in combination with a polybasic acid anhydride is considered within the scope of this invention. Polybasic acid anhydrides applicable to this invention include both aliphatic and aromatic dicarboxylic acid anhydrides, either saturated or unsaturated, such as succinic, adipic, maleic, tricarbalylic, phthalic and pyromellitic. Endo-cis-bicyclo-(2,2,1)-5-heptene-2,3-dicarboxylic anhydride (sold under the trademark "Nadic" anhydride), 1,4,5,6,7,7-hexachlorobicyclo-(2,2,1)-5-heptene - 2,3 - dicarboxylic anhydride (sold under the trademark "Chlorendic" anhydride) are also desirable. For convenience these acids will be referred to hereinafter as "Nadic" and "Chlorendic." Preferred polybasic acid anhydrides are the anhydrides of dicarboxylic acids, preferably phthalic acid anhydride. Acid anhydrides, which are produced by diene-syntheses can also be used, for instance, the acid anhydrides which are derived from eleostearic acid-glyceride and maleic acid anhydride, also those of maleic acid anhydride plus terpinene of limonene or other unsaturated hydrocarbons of the terpene series.

It has been emphasized that in accordance with an aspect of this invention resin compositions having a wide range of flexibility are obtainable. The flexibility of resins prepared according to this invention for the most part varies in direct proportion to the percent polyoxyalkylene glycol employed. For example, resins containing about 50 percent polyoxyalkylene glycol are tough and quite elastic, the resins differing from rubber in that their recovery from elongation, although complete, is quite slow. Resins containing from 30 to 40 percent polyoxyalkylene glycol are tough but somewhat less flexible. On the other hand, cured resins containing about 20 percent polyoxyalkylene glycol are tough and slightly flexible, while resins containing less than 20 percent are less and less flexible as the amount of polyoxyalkylene glycol decreases. In general, it can be said that a maximum degree of flexibility can be obtained by the use of about 50 to 60 percent polyoxyalkylene glycol by weight based on the weight of the total reaction mixture (i.e., the percent polyoxyalkylene glycol, the percent polybasic acid anhydride and the percent glycidyl polyether will total 100 percent). In other words, the polyoxyalkylene glycol is used in an amount of from, say 1 percent to about 60 percent by weight based on the composition.

While polyoxyalkylene glycols employed are in the range of from 1 percent to about 60 percent by weight based on the mixture of ingredients, it has been found that the maximum amount of polyoxyalkylene glycol which can be employed within this range is dependent upon both the molecular weight of the polyoxyalkylene glycol and the weight per epoxide of the glycidyl polyether. Therefore, when it is desired to obtain resins of increased flexibility, containing greater quantities of polyoxyalkylene glycol within the range set forth, a certain degree of selectivity must be exercised. In general, it can be said that the amounts of polyoxyalkylene glycol and glycidyl polyether which can be used vary directly with the molecular weight of the polyoxyalkylene glycol but inversely with the weight per epoxide of the glycidyl polyether. Thus, a higher molecular weight polyoxyalkylene glycol can be used in greater quantities than lower molecular weight polyoxyalkylene glycols, and more polyoxyalkylene glycol can be used with lower than with higher weight per epoxide glycidyl polyether.

Referring first to high weight per epoxide glycidyl polyethers, for example, glycidyl polyethers having weights per epoxide of from 500 to 1000, only small percentages of the 1 to 60 percent range of polyoxyalkylene glycol are desirable. Thus, preferably not more than 30 and in some cases 40 percent polyoxyalkylene glycol will be used in the case of polyoxyalkylene glycols having molecular weights of 4000, while not more than 10 percent is preferred of polyoxyalkylene glycols having molecular weights of 600. These maximum percentages of polyoxyalkylene glycol can best be expressed as formulas. In the case of glycidyl polyethers having weights per epoxide of from 500 to 1000, a convenient formula for general use is $170(x-10)=y-600$, wherein $y$ is the molecular weight of the polyoxyalkylene glycol and $x$ is the percent desirably employed, with the proviso, however, that in any case not more than about 30 percent will be used. As an example, if it is desired to prepare a resin using polyoxyalkylene glycol with a molecular weight of 3000, $y$ will be 3000 and the percent glycol to be used can be readily derived from the formula.

Turning to glycidyl polyethers having weights per epoxide of from 250 to 500, when polyoxyalkylene glycols having molecular weights of about 600 are employed, the amount of polyoxyalkylene glycol preferably will not exceed about 20 percent. In the case of polyoxyalkylene glycols with molecular weights of about 4000, however, about 40 percent glycol can be used. A working formula for use in this range is $170(x-20)=y-600$, wherein as before $y$ represents the molecular weight of the polyoxyalkylene glycol and $x$ represents the percent polyoxyalkylene glycol which is preferred. The maximum amount of polyoxyalkylene glycol, of course, will not exceed about 40 percent, the degree of flexibility of the cured resin increasing as the proportion of polyoxylalkylene glycol approaches 40 percent.

Since the amount of polyoxyalkylene glycol varies inversely with the weight per epoxide of glycidyl polyether, with glycidyl polyethers having low weights per epoxide, for example, 150 to 250, the largest quantities of polyoxyalkylene glycol can be used. In the case of polyoxyalkylene glycols having molecular weights of from 4000 to 6000 as much as 50 to 60 percent can be used; and in the case of low molecular weight polyoxyalkylene glycols, e.g., 600, as much as 30 percent can be used. A convenient expression for determining the desired amount of polyoxyalkylene glycol for this class of glycidyl polyethers is $170(x-30)=y-600$, $y$ being the molecular weight of polyoxyalkylene glycols and $x$ being its percentage.

In order more clearly to describe the relationshiup between the molecular weights of polyoxyalkylene glycols and glycidyl polyethers of particular weights per epoxide reference is made to the drawing.

In the drawing, the single figure is a triangular graph showing maximum percentages of polyoxyalkylene glycol.

The area delineated by the points A, B, C, D represents the maximum amount, in percent by weight on the composition, of polyoxyalkylene glycol which generally will be used with a particular glycidyl polyether. Since there can be no rigid formula there will, of course, be instances where more than this preferred maximum amount can be used. In general, however, results obtained thereby are not as good. The figure represents a conventional triangular graph and maximum percentages can be read directly from the graph. For example, given a polyoxyalkylene glycol of a particular molecular weight and a glycidyl polyether of a particular weight per epoxide, the preferred maximum of polyoxyalkylene glycol can be read directly from the triaxial diagram. Accordingly, it is unnecessary to list these preferred maximum percentages in the form of a table.

The relationship between polyoxyalkylene glycols of particular molecular weights and glycidyl polyethers of particular weights per epoxide will be further illustrated by the examples which follow. It is believed, however, that the examples can be better understood by first considering the preparation of particular glycidyl polyethers which it is preferred to use in accordance with this invention.

PREPARATION OF GLYCIDYL POLYETHERS

Glycidyl Polyether A

About 276 parts (3 mols) of glycerol were mixed with 832 parts (9 mols) of epichlorhydrin. To this reaction mixture were added 10 parts of diethyl ether solution containing about 4.5 percent boron trifluoride, according to U.S. Patent 2,581,464. The temperature of this mixture was between 50° C. and 75° C. for about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The resulting polyglycidyl ether was a pale yellow, viscous liquid. It had a weight per epoxide of 155.

Glycidyl Polyether B

About 1 mol of bisphenol was dissovled in 10 mols of ephichlorydrin and 1 to 2 percent water added to the resulting mixture. The mixture was then brought to 80° C. and 2 mols of sodium hydroxide added in small portions over a period of about 1 hour. During the addition, the temperature of the mixture was held at about 90° C. to 110° C. After the sodium hydroxide had been added, the water formed in the reaction and most of the epichlorhydrin was distilled off. The residue was combined with an approximately equal amount of benzene and the mixture filtered to remove the salt. The benzene was then removed to yield a viscous liquid having a weight per epoxide of 185.

Glycidyl Polyether C

A solution consisting of 11.7 parts of water, 1.22 parts of sodium hydroxide and 13.38 parts of bisphenol was prepared by heating the mixture of ingredients to 70° C. and then cooling to 46° C., at which temperature 14.06 parts of epichlorhydrin were added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semisolid having a melting point of 26° C. by Durrans' Mercury Method and a weight per epoxide of 240.

Glycidyl Polyether D

In a reaction vessel fitted with a stirrer, 4 mols of bis-(4-hydroxyphenyl)-2,2-propane (bisphenol) and 5 mols of epichlorhydrin were added to 6.43 mols of sodium hydroxide as a 10 percent aqueous solution. While being stirred, the reaction mixture was gradually heated to about 100° C., during 80 minutes time and was maintained at 100–104° C. for an additional 60 minutes under reflux. The aqueous layer was decanted and the resin washed with boiling water until neutral to litmus whereupon the resin was drained and dehydrated by heating to about 150° C. The resulting glycidyl polyether had a softening point of 100° C. (Durrans' Mercury Method) and a weight per epoxide of 960.

Glycidyl Polyether E

About 744 parts (3.26 mols) of 2,2-bis (4-hydroxyphenyl)propane and 223 parts (5.57 mols) of sodium hydroxide (20 percent excess) were combined in 1900 parts water and heated to about 29° C. whereupon 423 parts (4.5 mols) of epichlorhydrin were added rapidly. The temperature was increased and remained at about 93° C. for 90 minutes. The mixture was separated into a two phase system and the aqueous layer drawn off. The resinous layer that remained was washed with hot water and then drained and dried at a temperature of 140° C. The Durrans' Mercury Method melting point of the resulting product was 80° C. and the weight per epoxide was about 586.

Glycidyl Polyether F

In a flask equipped with a stirrer, condenser, and thermometer were placed 330 grams (3 mols) of resorcinol, and 2775 grams (30 mols) of epichlorhydrin in 27 grams of water. To this mixture 250 grams of sodium hydroxide flakes were slowly added in two additions. First 165 grams were added and the flask was slowly heated. When the temperature reached 105° C., heat was withdrawn and the mixture was cooled in a water bath. When the temperature of the mixture decreased to 100° C., an additional 85 grams of sodium hydroxide were added, the mixture being continuously cooled because of the exothermic reaction. After the exotherm subsided, the material was distilled to remove the water. The flask was then cooled, 1000 cc. of benzene added, and the product filtered to remove the sodium chloride. The excess epichlorhydrin and other volatile matter were removed under vacuum. A pale amber, viscous liquid having a weight per epoxide of 143 was obtained.

Glycidyl Polyether G

Following the example for the preparation of Glycidyl Polyether F a glycidyl polyether was prepared using p,p'-dihydroxydiphenyl instead of resorcinol, the molar proportions as well as the procedure being the same as in the preceding example. The resulting glycidyl polyether was a white crystalline solid having a weight per epoxide of 153.

Glycidyl Polyether H

Following the example for the preparation of Glycidyl Polyether F a glycidyl polyether was prepared using p,p'-dihydroxydiphenyl sulfone instead of resorcinol, the molar proportions as well as the procedure being the same. The resulting glycidyl polyether was a white crystalline solid having a melting point of 163° C. and a weight per epoxide of 192.

As indicated previously, while the invention is not limited to the use of a catalyst, improved cures are obtained thereby. Generally speaking, any of the known catalysts which are activators for epoxide-carboxyl reactions can be used to increase the rate of cure of the composition, for example, organic bases, tertiary amines and quaternary ammonium hydroxides. Basic catalysts are generally used for this purpose, for example, alkali metal or alkaline earth metal hydroxides and also organic bases. Examples are sodium hydroxide, dimethylaminomethyl phenol and benzyl trimethyl ammonium hydroxide. These alkaline compounds are employed in catalytic quantities of from 0.10 to 5.0 percent.

It was pointed out that the polyoxyalkylene glycol and glycidyl polyether are reacted through the use of a polybasic acid anhydride. Since it is necessary to employ an excess of polybasic acid anhydride beyond that required to react with, or esterify, the polyoxyalkylene glycol the quantity of acid necessarily varies directly with the amount of polyoxyalkylene glycol employed. As will be shown in the examples, normally the polybasic acid anhydride is employed in an amount of 15 to 45 percent based on the weight of the reactants. In determining the amount of polybasic acid anhydride to be used within the percentage range it is desirable to consider the number of epoxide groups of the particular glycidyl polyether used. The best results are obtained by using the polybasic acid anhydride and glycidyl polyether in such proportions that there will be one anhydride group per each epoxide group. More than one anhydride group per epoxide group can be used, of course, but the product will merely contain either unreacted anhydride or free carboxyl groups. Likewise, it is undesirable to employ epoxide to anhydride in a ratio of less than one epoxide group of 0.5 anhydride group. In general, therefore, after the amount of polyoxyalkylene glycol to be used is determined, glycidyl polyether and dibasic acid anhydride will be employed therewith in a ratio of epoxide group to anhydride group of from 2:1 to 1:2 to make the curable composition.

PREPARATION OF FLEXIBLE RESINS

Using the glycidyl polyethers prepared in accordance with the above examples the preparation of flexible, cured resins of this invention can now be illustrated, cured resins being resins changed from the soluble, fusible state to the insoluble, infusible state by chemical action. The following examples, of course, are intended to be illustrative only, since in the light of these examples variations and modifications obivously will occur to those skilled in the art.

Example 1

Forty-seven percent by weight of Glycidyl Polyether B, 33 percent by weight of phthalic acid anhydride, and 20 percent by weight of polyoxyethylene glycol having a molecular weight of about 4000, were heated together with stirring until a clear melt was obtained. The mixture was cooled slightly and 1 percent of a tertiary amine catalyst (dimethylaminomethyl phenol) was added with stirring. Approximately 25 grams of the resulting mixture were then poured into an aluminum cup 2 inches in diameter. The cup was placed in a closed container so that none of the anhydride would be lost through volatilization, and curing was accomplished by heating the product at 180° C. for 1 hour. A fairly flexible, tough resin was obtained which was unaltered by further heating. The resin was well cured.

Example 2

Forty-one percent by weight of Glycidyl Polyether C, 29 per cent by weight of phthalic acid anhydride, and 30 percent by weight of polyoxyethylene glycol having a molecular weight of about 6000 were heated together with stirring until a clear melt was obtained. The mixture was cooled slightly and 1 per cent of a tertiary amine catalyst (dimethylaminomethyl phenol) was added with stirring. Approximately 25 grams of the resulting mixture were then poured into an aluminum cup 2 inches in diameter. The cup was placed in a closed container so that none of the anhydride would to lost through volatilization, and curing was accomplished by heating the product at 180° C. for 1 hour. A flexible, tough resin, which was unaltered by further heating, was obtained. The resin was well cured.

Example 3

Following the procedure of Example 2 resin compositions were made using the following percentages of the Glycidyl Polyether B, phthalic acid anhydride (Anhydride), and polyoxyethylene glycol (POEG) having a molecular weight of about 4000.

| Glycidyl Polyether, percent | Anhydride, percent | POEG, percent | Properties |
|---|---|---|---|
| 45 | 45 | 10 | Very, very slightly flexible. |
| 50 | 30 | 20 | Very slightly flexible. |
| 44 | 26 | 30 | Slightly flexible. |
| 38.5 | 31.5 | 30 | Do. |
| 33 | 27 | 40 | Flexible. |
| 27 | 23 | 50 | Rubbery. |

All of the products used in the above proportions were tack free, well cured resins. However, when 60 percent polyoxyethylene glycol was used, incompatible or wax-like products were obtained.

Example 4

Following the procedure of Example 2 resin compositions were made using the following percentages of Glycidyl Polyether C, phthalic acid anhydride (Anhydride), polyoxyethylene glycol (POEG) having a molecular weight of 4000.

| Glycidyl Polyether, percent | Anhydride, percent | POEG, percent | Properties |
|---|---|---|---|
| 44 | 36 | 20 | Very slightly flexible but hard. |
| 50 | 30 | 20 | Do. |
| 38 | 32 | 30 | Slightly flexible and pliable. |
| 44 | 26 | 30 | Do. |
| 37 | 23 | 40 | Flexible. |
| 33 | 27 | 40 | Do. |
| 27 | 23 | 50 | Rubbery. |

All of the above products were clear, compatible, well cured resins. Of the two resins containing the same amount of polyoxyethylene glycol, for example, the two containing 20 percent or the two containing 30 (or 40) percent, the resin containing the greater amount of phthalic acid anhydride was harder than that containing less phthalic acid anhydride. In other words, the first resin, the 44, 36, 20 composition was harder than the second resin, the 50, 30, 20 composition.

Example 5

Following the procedure of Example 2 resin compositions were made using the following percentages of Glycidyl Polyether E, phthalic acid anhydride (Anhydride), polyoxyethylene glycol (POEG) having a molecular weight of 4000.

| Glycidyl Polyether, percent | Anhydride, percent | POEG, percent | Properties |
|---|---|---|---|
| 70 | 20 | 10 | Not brittle. |
| 57 | 23 | 20 | Very slightly flexible. |
| 50 | 20 | 30 | Slightly flexible. |
| 43 | 17 | 40 | Flexible. |

All of the above resins were well cured. There were signs of incompatibility when 40 percent polyoxyethylene glycol was employed, particularly as the ratio of glycidyl polyether to phthalic acid anhydride approached one. When 50 percent polyoxyethylene glycol was used the resin was incompatible.

Example 6

Following the procedure of Example 2 resin compositions were made using the following percentages of Glycidyl Polyether F, phthalic acid anhydride (Anhydride), polyoxyethylene glycol (POEG) having a molecular weight of 4000.

| Glycidyl Polyether, percent | Anhydride, percent | POEG, percent | Properties |
|---|---|---|---|
| 40 | 40 | 20 | Very slightly flexible. |
| 35 | 35 | 30 | Slightly flexible. |
| 30 | 30 | 40 | Flexible. |
| 25 | 25 | 50 | Do. |

The above percentages appear to be optimum formulas for resins employing Glycidyl Polyether F. Of examples containing 50 percent polyoxyethylene glycol, some, while clear, cured resins showed evidence of pressure tack. Tacky resins resulted from the use of 60 percent polyoxyethylene glycol.

Example 7

Following the procedure of Example 2 resin compositions were made using the following percentages of Glycidyl Polyether G, phthalic acid anhydride (Anhydride), polyoxyethylene glycol (POEG) having a molecular weight of 4000.

| Glycidyl Polyether, percent | Anhydride, percent | POEG, percent | Properties |
|---|---|---|---|
| 40 | 40 | 20 | Hard, tough and slightly flexible. |
| 35 | 35 | 30 | Slightly flexible. |
| 30 | 30 | 40 | Flexible. |
| 25 | 25 | 50 | Very flexible. |

With this particular glycidyl polyether extremely well cured, clear, flexible resins were obtained using 60 percent polyoxyethylene glycol.

Example 8

Following the procedure of Example 2 resin compositions were made using the following percentages of Glycidyl Polyether H, phthalic acid anhydride (Anhydride), polyoxyethylene glycol (POEG) having a molecular weight of 4000.

| Glycidyl Polyether, percent | Anhydride, percent | POEG, percent | Properties |
|---|---|---|---|
| 45 | 35 | 20 | Very slightly flexible, hard and tough. |
| 40 | 30 | 30 | Slightly flexible and slightly soft. |
| 35 | 25 | 40 | Flexible and soft. |
| 30 | 20 | 50 | Extremely flexible. |

In some cases using 60 percent, extremely flexible resins were obtained, while other resins prepared using 60 percent polyoxyethylene glycol were cloudy.

Example 9

Following the procedure of Example 2 resin compositions were made using the following percentages of Glycidyl Polyether C, phthalic acid anhydride (Anhydride), polyoxyethylene glycol (POEG) having a molecular weight of 600.

| Glycidyl Polyether, percent | Anhydride, percent | POEG, percent | Properties |
|---|---|---|---|
| 44 | 36 | 20 | Somewhat flexible. |
| 38 | 32 | 30 | Slightly flexible. |

The above glycidyl polyethers resulted in well cured resins. However, attempts to incorporate 40 to 50 percent polyoxyethylene glycol resulted in poorly cured products.

Example 10

Resins were prepared in accordance with Example 2 using acid anhydrides other than phthalic acid anhydrides with Glycidyl Polyether C and polyoxyethylene glycol having a molecular weight of 4000. The acid anhydrides employed were "Clorendic",[1] "Nadic",[1] maleic, and pyromellitic, the proportions being given in the following table.

| Glycidyl Polyether, percent | Anhydride | POEG, percent |
|---|---|---|
| 40 | "Chlorendic",[1] 40% | 20 |
| 50 | "Nadic",[1] 30% | 20 |
| 60 | Maleic, 20% | 20 |
| 60 | Pyromellitic, 20% | 20 |

[1] Trademark.

The above resins were comparable to those prepared using phthalic acid anhydride with the exception that some care must be used in incorporating pyromellitic acid anhydride in the glycidyl polyether. In some cases, careful heating at a higher temperature may be desirable.

Example 11

Following the procedure of Example 2 resin compositions were made using Glycidyl Polyether B, phthalic acid anhydride and polyoxyethylene glycol having a molecular weight of 1500. A cured resin was obtained using 35 percent polyoxyethylene glycol having the molecular weight of 1500, along with 37 percent glycidyl polyether and 28 percent phthalic acid anhydride, but when 40 percent polyoxyethylene glycol was used, with 33 percent glycidyl polyether and 27 percent phthalic acid anhydride, the resin, while compatible, did not cure.

Example 12

Following the procedure of Example 2 several cured resin compositions were made using various glycidyl polyethers, phthalic acid anhydride and polyoxyethylene glycols having molecular weights of 2000 (POEG 2000) 4000 (POEG 4000) as follows:

| Glycidyl Polyether | Anydride | POEG |
|---|---|---|
| 40% glycidyl polyether A | 20% phthalic | 20% POEG 4,000. |
| 60% glycidyl polyether B | 35% phthalic | 5% POEG 2,000. |
| 60% glycidyl polyether B | 30% phthalic | 10% POEG 2,000. |
| 70% glycidyl polyether E | 20% phthalic | 10% POEG 2,000. |

The above examples show that, for the most part, the properties of the resins are dependent upon the amount of polyoxyalkylene glycol which can be incorporated in the final resin composition. Further, the maximum amount of polyoxyalkylene glycol which will result in a good cure, in general, varies directly with the molecular weight of the polyoxyalkylene glycol. Thus, as shown in Example 11 no cure was obtained using 40 percent polyoxyalkylene glycol having a molecular weight of 1500. As shown in Examples 1 through 7, however, when polyoxyalkylene glycol having a molecular weight of 4,000 is used as much as 50 percent can be employed and in some instances, as shown in Example 8, as much as 60 percent can be employed.

The examples show, as indicated hereinbefore, that compositions in which it is possible to incorporate 50 percent polyoxyalkylene glycol are more flexible than those using lower molecular weight polyoxyethylene glycol where it is possible to incorporate only 30 to 40 percent or less polyoxyalkylene glycol. The diglycidyl polyethers derived from dihydric phenols yielded the toughest resins and my preferred resin composition is that prepared from p,p'-dihydroxydiphenyl. The resin compositions prepared from glycidyl polyethers derived from resorcinol, and bis(4-hydroxyphenyl)2,2-propane dihydroxydiphenyl sulfone appear to be quite similar in properties. With respect to the polyoxyalkylene glycols, I prefer the high molecular weight polyoxyalkylene glycols, for example, those having a molecular weight of about 4000.

According to various aspects of the invention described thus far, novel cured resinous compositions having a wide range of usefulness, particularly in the electrical field, are provided along with a process for their production. According to another aspect of this invention, however, it is not necessary that the reaction be carried to completion. Intermediate compositions can be prepared from the glycidyl polyether-polyoxyalkylene glycol-polybasic acid anhydride mixture which are particularly useful as hot-melt resins for molding, hot metal coating, and the like. These intermediate compositions are still soluble and fusible, the final reaction being affected by further heating while the composition is in the form of a film or molding composition, etc. In the preparation of this intermediate or hot-melt composition a low molecular weight polyhydroxyalcohol, for example, glycerol, ethylene glycol, trimethylol ethane, and pentaerythritol, can be added to the glycidyl polyether-polyoxyalkylene glycol-polybasic acid anhydride mixture. When a low molecular weight polyhydroxy alcohol is used and when the mixture is heated until a compatible resin is obtained a homogeneous soluble, fusible product results which is capable upon further heating of forming an insoluble, infusible cured composition. By low molecular weight polyhydroxy alcohols are intended monomeric polyhydric alcohols having molecular weights per hydroxyl group of 31 to 51, or alcohols having molecular weights of less than about 500.

The preparation of resinous intermediates of the type contemplated herein can be best illustrated by means of the following examples.

Example 13

Into a one liter flask, equipped with stirrer, condenser, and thermometer, were placed 285 grams of Glycidyl Polyether B, 120 grams of polyoxyethylene glycol having a molecular weight of 4000, 180 grams of phthalic acid anhydride, 15 grams of glycerin and 200 grams of methylisobutyl ketone (MIBK). This solution was heated at a temperature of approximately 130° C. for 90 minutes after which an additional 150 grams of methylisobutyl ketone (MIBK) were added, and the solution was then heated for an additional 90 minutes. A compatible resin (M) was obtained. A second resin (N) was prepared using Glycidyl Polyether C instead of Glycidyl Polyether B. A comparison of these two intermediate resin compositions is as follows:

| Solvent | N MIBK | M MIBK |
|---|---|---|
| Percent N. V. | 61.3 | 61.2 |
| Acid Value | 78.7 | 74.7 |
| Gardner Viscosity | E-F | C |

According to another aspect of this invention the intermediate resin composition resulting from the combination of the glycidyl polyether-polybasic acid anhydride-polyoxyalkylene glycol mixture with the low molecular weight polyhydroxy alcohol can be effectively employed in the preparation of coating compositions. In this instance a suitable solvent is normally employed. The amount of solvent employed can be readily ascertained by one skilled in the art since it depends upon film thickness and other requirements known to those in the field of coating compositions. This amount is normally between 30 and 70 percent. The following example will serve to illustrate the use of these resinous intermediates as coating compositions.

Example 14

Films were prepared using resinous intermediate M of Example 13, to which 1 percent of an alkaline catalyst, dimethylaminomethyl phenol, was added. The films were heated for 30 minutes at 180° C. to cure the resin. The resulting films were well cured, possessed good mar resistance and more flexibility than is normally required.

While the coating compositions or film formers of this invention are satisfactory, variations obviously will occur to those skilled in the art. Thus, should any of the films have a tendency to crawl, an amount, say 2 percent to 40 percent of a butylated urea or melamine formaldehyde resin or a phenolic resin can be employed. In some instances, for example, it will also be desirable to use butylated urea formaldehyde resin in lieu of the basic catalyst. Thus, films prepared from 30 percent butylated urea formaldehyde resin in the absence of the basic catalyst possess a desirable combination of properties. Other embodiments of the invention are possible within the scope of this invention. It is noted, for example, that mixtures of any of the resins of this invention, with other resinous compositions, can be made. Moreover, various additions can be made either to the mixture of reactants or to the intermediate resinous compositions. In many instances it will be necessary to add dyes or pigments as well as fibrous materials, powdered fillers and the like. Since these will depend upon the use which is made of the particular resin, the invention is not limited thereby.

What is claimed is:

1. A process for preparing cross-linked resinous compositions having a wide range of flexibility which comprises heating at a temperature and for a time sufficient to obtain an insoluble, infusible product, a polyoxyalkylene glycol having a molecular weight of 600 to 6000, a glycidyl polyether of a polyhydroxy compound of the group consisting of phenols containing at least two phenolic hydroxyl groups, and polyhydric alcohols, said polyether containing more than one epoxide group per molecule and having a weight per epoxide below 1000 and a polycarboxylic acid anhydride in excess of that required to react with the polyoxyalkylene glycol, the degree of flexibility of the cured resin increasing as the proportion of polyoxyalkylene glycol increases, the maximum amount of polyoxyalkylene glycol depending upon both the weight per epoxide of the glycidyl polyether and upon the molecular weight of the polyoxyalkylene glycol, the amount of polyoxyalkylene glycol of a given molecular weight being used with a glycidyl polyether of a particular weight per epoxide in amounts not exceeding amounts represented by the area delineated by points A, B, C, D of the drawing, the polycarboxylic acid anhydride and glycidyl polyether being used in a ratio such that there is at least 0.5 anhydride group per one epoxide group.

2. The method according to claim 1 wherein the polyoxyalkylene glycol is polyoxyethylene glycol, wherein the polycarboxylic acid anhydride is phthalic acid anhydride and wherein the polyether is a glycidyl polyether of p,p'-dihydroxydiphenyl having a weight per epoxide of less than 250.

3. The method according to claim 1 wherein the polyoxyalkylene glycol is polyoxyethylene glycol, wherein the polycarboxylic acid anhydride is phthalic acid anhydride and wherein the polyether is the glycidyl polyether of 2,2-bis(p-hydroxyphenyl)propane having a weight per epoxide of 170 to 200.

4. The method according to claim 1 wherein the process is carried out in the presence of a catalyst selected from the group consisting of alkali metal and alkaline earth metal hydroxides, dimethyl aminomethyl phenol, and benzyl trimethyl ammonium hydroxide.

5. The process of claim 1 wherein at least part of the polyoxyalkylene glycol is reacted with polycarboxylic acid anhydride prior to addition of glycidyl polyether and remaining polycarboxylic acid anhydride.

6. Cross-linked infusible reaction products resulting from the process of claim 1 wherein the weight per epoxide of the glycidyl polyether is not greater than 200.

7. A process for preparing cross-linked resins having an enhanced degree of flexibility which comprises heating at a temperature and for a time sufficient to obtain an insoluble, infusible product, a polyoxyalkylene glycol having a molecular weight of 600 to 6000, a glycidyl polyether of a polyhydroxy compound of the group consisting of phenols containing at least two phenolic hydroxyl groups, and polyhydric alcohols, said polyether containing more than one epoxide group per molecule and having a weight per epoxide below about 250, and a polycarboxylic acid anhydride in excess of that required to react with the polyoxyalkylene glycol, the maximum amount of polyoxyalkylene glycol employed with glycidyl polyethers having weights per epoxide below 250 being $170(x-30) = y - 600$, where $x$ represents the percent polyoxyalkylene glycol and $y$ represents its molecular weight with the proviso that in any case not more than 50 percent polyoxyalkylene glycol is used, the degree of flexibility of the cured resin increasing as the proportion of polyoxyalkylene glycol approaches 50 percent, the polycarboxylic acid anhydride and glycidyl polyether being used in relation to each other such that the ratio of epoxide groups to anhydride groups is from 2:1 to 1:2.

8. A process for preparing cross-linked resins having a wide range of flexibility which comprises heating at a temperature and for a time sufficient to obtain an insoluble, infusible product, a polyoxyalkylene glycol having a molecular weight of 600 to 6000, a glycidyl polyether of a polyhydroxy compound of the group consisting of phenols containing at least two phenolic hydroxyl groups, and polyhydric alcohols, said polyether containing more than one epoxide group per molecule and having a weight per epoxide of from about 250 to about 500 and a polycarboxylic acid anhydride in excess of that required to react with the polyoxyalkylene glycol, the maximum amount of polyoxyalkylene glycol employed with glycidyl polyethers having weights per epoxide of 250 to 500 being $170(x-20)=y-600$, where $x$ represents the percent polyoxyalkylene glycol and $y$ represents its molecular weight, with the proviso that in any case not more than 40 percent polyoxyalkylene glycol is used, the degree of flexibility of the cured resin increasing as the proportion of polyoxyalkylene glycol approaches 40 percent, the polycarboxylic acid anhydride and glycidyl polyether being used in relation to each other such that the ratio of epoxide groups to anhydride groups is from 2:1 to 1:2.

9. A process for preparing cross-linked resins having a wide range of flexibility which comprises heating at a temperature and for a time sufficient to obtain an insoluble, infusible product, a polyoxyalkylene glycol having a molecular weight of 600 to 6000, a glycidyl polyether of a polyhydroxy compound of the group consisting of phenols containing at least two phenolic hydroxyl groups, and polyhydric alcohols, said polyether containing more than one epoxide group per molecule and having a weight per epoxide of from 500 to 1000 and a polycarboxylic acid anhydride in excess of that required to esterify the polyoxyalkylene glycol, the maximum amount of polyoxyalkylene glycol employed with glycidyl polyethers having weights per epoxide of 500 to 1000 being $170(x-10)=y-600$, where $x$ represents the percent of polyoxyalkylene glycol and $y$ represents its molecular weight, with the proviso that in any case not more than 30 percent polyoxyalkylene glycol is used, the degree of flexibility of the cured resin increasing as the proportion of polyoxyalkylene glycol approaches 30 percent, the polycarboxylic acid anhydride and glycidyl polyether being used in relation to each other such that the ratio of epoxide groups to anhydride groups is from 2:1 to 1:2.

10. Cross-linked infusible reaction products of improved flexibility resulting from the process of claim 7.

11. Cross-linked infusible reaction products of improved flexibility resulting from the process of claim 8.

12. Cross-linked infusible reaction products of improved flexibility resulting from the process of claim 9.

13. A process for preparing cross-linked resins having a wide range of flexibility which comprises heating at a temperature and for a time sufficient to obtain an insoluble, infusible product, polyoxyethylene glycol having a molecular weight of 4000 to 6000 and a glycidyl polyether of a polyhydroxy compound of the group consisting of phenols containing at least two phenolic hydroxyl groups, and polyhydric alcohols, said polyether containing more than one epoxide group per molecule and having a weight per epoxide of 170 to 250, with an excess of phthalic acid anhydride beyond that required to react with the polyoxyethylene glycol, the proportions of the reactants being in the range of 1 percent by weight polyoxyethylene glycol, 29 percent by weight phthalic acid anhydride and 70 percent glycidyl polyether; to 50 percent by weight polyoxyethylene glycol, 23 percent by weight phthalic acid anhydride, and 27 percent by weight glycidyl polyether, the degree of flexibility of the cured resin increasing as the proportions of polyoxyethylene glycol within said range increases.

14. Cross-linked reaction products of improved flexibility resulting from heating in the presence of a tertiary amine catalyst and at a temperature and for a time sufficient to obtain an insoluble, infusible product, a polyoxyethylene glycol having a molecular weight of from 3000 to 6000 and a glycidyl polyether of a polyhydroxy compound of the group consisting of phenols containing at least two phenolic hydroxyl groups, and polyhydric alcohols, said polyether containing more than one epoxide group per molecule and having a weight per epoxide of 150 to 250, with an excess of phthalic acid anhydride beyond that necessary to esterify the glycol, the proportions of the reactants being from 30 to 45 percent by weight polyoxyethylene glycol, with from 40 to 30 percent by weight glycidyl polyether, the remainder being phthalic acid anhydride.

15. A composition containing as its essential constituents a polyoxyethylene glycol having a molecular weight of 600 to 6000, a glycidyl polyether of a polyhydroxy compound of the group consisting of phenols containing at least two phenolic hydroxyl groups, and polyhydric alcohols, said polyether containing more than one epoxide group per molecule and having a weight per epoxide below 1000 and a polycarboxylic acid anhydride in excess of that required to react with the polyoxyalkylene glycol, the maximum amount of polyoxyalkylene glycol depending upon both the weight per epoxide of the glycidyl polyether and upon the molecular weight of the polyoxyalkylene glycol, the amount of polyoxyalkylene glycol of a given molecular weight being used with a glycidyl polyether of a particular weight per epoxide in amounts not exceeding amounts representd by the area delineated by the points A, B, C, D of the drawing, the polycarboxylic acid anhydride and glycidyl polyether being used in a ratio such that for each epoxide group there is from 0.5 to one anhydride group.

16. As a new composition, the composition of claim 15 having from 1 percent to 5 percent by weight of a monomeric polyhydric alcohol in admixture therewith having a weight per hydroxyl group of 31 to 51.

17. The homogeneous fusible product resulting from mixing and heating the composition of claim 16 at a temperature sufficient to dissolve the anhydride in the glycidyl polyether, said product being soluble in methyl isobutyl ketone, and said product capable upon further heating of forming an insoluble, infusible cross-linked composition.

18. The composition of claim 17 in combination with from 2 to 40 percent of a butylated urea formaldehyde resin.

19. A liquid coating composition comprising the homogeneous product of claim 17 and methyl isobutyl ketone.

References Cited in the file of this patent

UNITED STATES PATENTS

| | | |
|---|---|---|
| 2,591,539 | Greenlee | Apr. 1, 1952 |
| 2,683,131 | Cass | July 6, 1954 |
| 2,720,500 | Cody | Oct. 11, 1955 |